United States Patent
Lee et al.

(10) Patent No.: US 11,315,032 B2
(45) Date of Patent: Apr. 26, 2022

(54) METHOD AND SYSTEM FOR RECOMMENDING CONTENT ITEMS TO A USER BASED ON TENSOR FACTORIZATION

(71) Applicant: Yahoo Holdings, Inc., Sunnyvale, CA (US)

(72) Inventors: Kuang-Chih Lee, Fremont, CA (US); Shandian Zhe, Beijing (CN)

(73) Assignee: YAHOO ASSETS LLC, Dulles, VA (US)

( * ) Notice: Subject to any disclaimer, the term of this patent is extended or adjusted under 35 U.S.C. 154(b) by 860 days.

(21) Appl. No.: 15/479,337

(22) Filed: Apr. 5, 2017

(65) Prior Publication Data

US 2018/0293506 A1    Oct. 11, 2018

(51) Int. Cl.
G06N 20/00    (2019.01)
G06N 5/04    (2006.01)
G06Q 30/02    (2012.01)
G06N 20/10    (2019.01)

(52) U.S. Cl.
CPC .............. *G06N 20/00* (2019.01); *G06N 5/04* (2013.01); *G06N 20/10* (2019.01); *G06Q 30/0277* (2013.01)

(58) Field of Classification Search
CPC .......... G06N 20/00; G06N 20/10; G06N 5/04; G06Q 30/0277
See application file for complete search history.

(56) References Cited

U.S. PATENT DOCUMENTS

| 8,818,919 B2 * | 8/2014 | Natarajan | G06Q 30/00 706/12 |
| 2014/0180760 A1 * | 6/2014 | Karatzoglou | G06Q 30/0269 705/7.29 |

OTHER PUBLICATIONS

Michalis K. Titsias, "Variational Learning of Inducing Variables in Sparse Gaussian Processes", AISTATS, proceeding of the 12th international conference on artificial intelligence and statistics, pp. 567-574, vol. 5, 2009 (Year: 2009).*

(Continued)

*Primary Examiner* — Eric Nilsson
(74) *Attorney, Agent, or Firm* — Venable LLP

(57) ABSTRACT

The present teaching relates to recommending content items to a user based on tensor factorization. In one example, a request is received for recommending content items to the user. Tensor data related to a plurality of users and a plurality of content items are obtained based on the request. The tensor data is decomposed into a plurality of sub-tensors based on a prior probability distribution. At least one bound is determined for a tensor factorization model that is generated based on the prior probability distribution. One or more items interesting to the user are predicted based on the at least one bound and the plurality of sub-tensors. At least one of the one or more items is recommended to the user as a response to the request.

21 Claims, 14 Drawing Sheets

(56) References Cited

OTHER PUBLICATIONS

Shandian Zhe et al., "DinTucker: Scaling up Gaussian process models on multidimensional arrays with billions of elements", arXIV, pp. 1-16, Feb. 1, 2014. (Year: 2014).*

Koh Takeuchi, Ryota Tomioka, Katsuhiko Ishiguro, Akisato Kimura, Hiroshi Sawada, "Non-negative Multiple Tensor Factorization", 2013 IEEE 13th International Conference on Data Mining, 2013, pp. 1119-1204 (Year: 2013).*

Q. Zhao, G. Zhou, L. Zhang, A. Cichocki and S. Amari, "Bayesian Robust Tensor Factorization for Incomplete Multiway Data," in IEEE Transactions on Neural Networks and Learning Systems, vol. 27, No. 4, pp. 736-748, Apr. 2016 (Year: 2016).*

* cited by examiner

METHOD AND SYSTEM FOR RECOMMENDING CONTENT ITEMS TO A USER BASED ON TENSOR FACTORIZATION

BACKGROUND

1. Technical Field

The present teaching relates to methods, systems, and programming for Internet services. Particularly, the present teaching is directed to methods, systems, and programming for recommending content items to a user based on tensor factorization.

2. Discussion of Technical Background

Recommendation techniques are increasingly being used to provide relevant and enjoyable information to users based on users' feedback and stated preferences. Existing systems applied either standard logistic regression or collaborative filtering (CF) based approaches to predict proper ads/news for a given user. Existing approaches require special process for the cold-start problem, which may be caused by the system's incapability of dealing with new items or new users due to the lack of relevant transaction history.

For a recommendation system, user data and content data may be represented by tensors, or multidimensional arrays, that are generalizations of matrices (from binary interactions) to high-order interactions between multiple entities. Tensor factorization is a powerful tool to analyze multi-way data. Recently proposed tensor factorization methods are computationally expensive and may suffer a severe learning bias in case of extreme data sparsity.

Therefore, there is a need to provide an improved solution for recommending content items to a user based on tensor factorization to solve the above-mentioned problems and avoid the above-mentioned drawbacks.

SUMMARY

The present teaching relates to methods, systems, and programming for Internet services. Particularly, the present teaching is directed to methods, systems, and programming for recommending content items to a user based on tensor factorization.

In one example, a method, implemented on a machine having at least one processor, storage, and a communication platform capable of connecting to a network for recommending content items to a user is disclosed. A request is received for recommending content items to the user. Tensor data related to a plurality of users and a plurality of content items are obtained based on the request. The tensor data is decomposed into a plurality of sub-tensors based on a prior probability distribution. At least one bound is determined for a tensor factorization model that is generated based on the prior probability distribution. One or more items interesting to the user are predicted based on the at least one bound and the plurality of sub-tensors. At least one of the one or more items is recommended to the user as a response to the request.

In a different example, a system having at least one processor, storage, and a communication platform capable of connecting to a network for recommending content items to a user is disclosed. The system includes: a recommendation request analyzer configured for receiving a request for recommending content items to the user; a user tensor data retriever configured for obtaining tensor data related to a plurality of users and a plurality of content items based on the request; a model bound generator configured for determining at least one bound for a tensor factorization model that is generated based on a prior probability distribution; a distributed inference engine configured for decomposing the tensor data into a plurality of sub-tensors based on the prior probability distribution and predicting one or more items interesting to the user based on the at least one bound and the plurality of sub-tensors; and a content recommendation engine configured for recommending at least one of the one or more items to the user as a response to the request.

Other concepts relate to software for implementing the present teaching on recommending content items to a user based on tensor factorization. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for recommending content items to a user is disclosed. The information, when read by the machine, causes the machine to perform the following: receiving a request for recommending content items to the user; obtaining tensor data related to a plurality of users and a plurality of content items based on the request; decomposing the tensor data into a plurality of sub-tensors based on a prior probability distribution; determining at least one bound for a tensor factorization model that is generated based on the prior probability distribution; predicting one or more items interesting to the user based on the at least one bound and the plurality of sub-tensors; and recommending at least one of the one or more items to the user as a response to the request.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
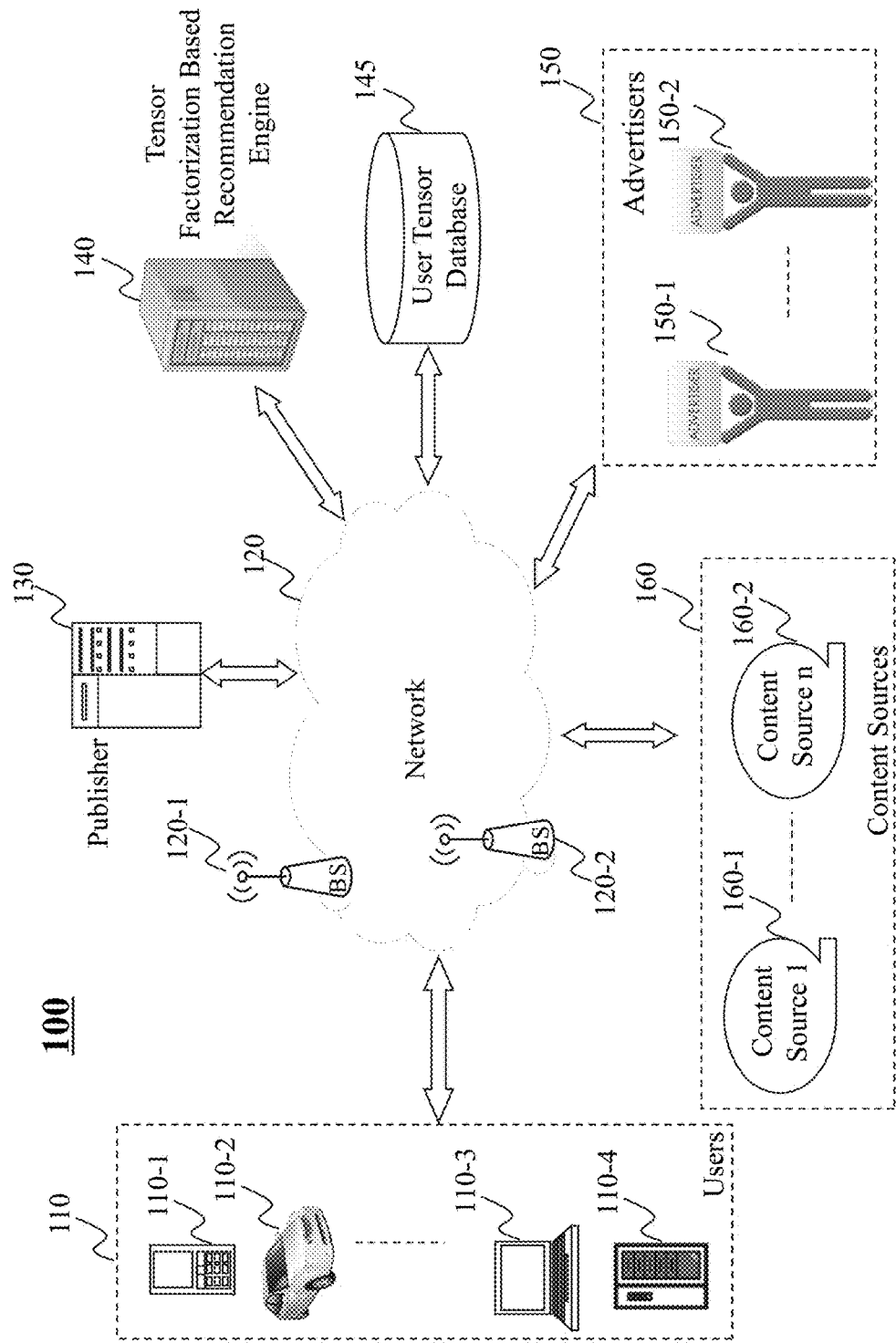
FIG. 1 is a high level depiction of an exemplary networked environment for recommending content items to a user based on tensor factorization, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficiently and effectively recommending content items to a user based on tensor factorization. The method and system as disclosed herein aim at improving users' online experience by recommending most proper items to the users.

The present teaching discloses a distributed, flexible nonlinear tensor factorization model, which avoids expensive computations and structural restrictions of Kronecker-product in Tensor-variate Gaussian process (TGP) formulations, and allows an arbitrary subset of tensor entries to be selected for training. The present teaching also discloses a tractable and tight variational evidence lower bound (ELBO) that enables highly decoupled, parallel computations and high-quality inference. Based on the new bound, the present teaching discloses a distributed, key-value-free inference algorithm in the MAP-REDUCE framework, which can fully exploit the memory cache mechanism in fast MAP-REDUCE systems such as SPARK. The disclosed approach is a unified approach that can handle sparse input data without special treatment. All side information or extra features can be easily added to the disclosed approach with simple extension.

Tensors, or multidimensional arrays, are generalizations of matrices (from binary interactions) to high-order interactions between multiple entities. For example, one can extract a three-mode tensor (user, advertisement, context) from online advertising logs. To analyze tensor data, people usually turn to factorization approaches, which use a set of latent factors to represent each entity and model how the latent factors interact with each other to generate tensor elements. Classical tensor factorization models assume multilinear interactions and hence are unable to capture more complex, nonlinear relationships. A recently proposed Infinite Tucker decomposition (InfTucker) generalizes existing model to infinite feature space using a Tensor-variate Gaussian process (TGP) and is hence more powerful in modeling intricate nonlinear interactions. However, InfTucker and its variants are computationally expensive, because the Kronecker product between the covariances of all the modes requires the TGP to model the entire tensor structure. In addition, InfTucker and its variants may suffer from the extreme sparsity of real-world tensor data, i.e., when the proportion of the nonzero entries is extremely low. As is often the case, most of the zero elements in real tensors are meaningless: they simply indicate missing or unobserved entries. Incorporating all of them in the training process may affect the factorization quality and lead to biased predictions.

To address these issues, the present teaching discloses a distributed, flexible nonlinear tensor factorization model, which has several important advantages. First, it can capture highly nonlinear interactions in the tensor, and is flexible enough to incorporate arbitrary subset of (meaningful) tensor entries for the training. This is achieved by placing a Gaussian process prior over tensor entries, where the input is constructed by concatenating the latent factors from each mode and the intricate relationships are captured by using the kernel function. By using such a construction, the covariance function is then free of the Kronecker-product structure, and as a result users can freely choose any subset of tensor elements for the training process and incorporate prior domain knowledge. For example, one can choose a combination of balanced zero and nonzero elements to overcome the learning bias. Second, the tight variational evidence lower bound (ELBO) derived using functional derivatives and convex conjugates subsumes optimal variational posteriors, thus evades inefficient, sequential E-M updates and enables highly efficient, parallel computations as well as improved inference quality. Moreover, the new bound helps to develop a distributed, gradient-based optimization algorithm. Finally, the present teaching develops a simple yet very efficient procedure to avoid the data shuffling operation, a major performance bottleneck in the (key-value) sorting procedure in MAP-REDUCE. That is, rather than sending out key-value pairs, each mapper simply calculates and sends a global gradient vector without keys. This key-value-free procedure is general and can effectively prevent massive disk I/Os and fully exploit the memory cache mechanism in fast MAP-REDUCE systems, such as SPARK.

Evaluations using small real-world tensor data have fully demonstrated the superior prediction accuracy of the disclosed system in comparison with existing works. On large tensors with millions of nonzero elements, the disclosed approach is significantly better than, or at least as good as popular large-scale nonlinear factorization methods based on TGP. In addition, the disclosed method achieves a faster training speed and enjoys almost linear speedup with respect to the number of computational nodes. The disclosed model can be applied to click-through-rate (CTR) prediction for online advertising and achieve a significant 20% improvement over the popular logistic regression and linear support vector machine (SVM) approaches.

The distributed, flexible nonlinear tensor factorization model disclosed in the present teaching can improve the accuracy in several different recommendation tasks; can significantly boost campaign performance in both Gemini and DSP+; and can easily handle data with extreme sparsity and cold-start problem.

The terms "content items" and "items" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for recommending content items to a user based on tensor factorization, according to an embodiment of the present teaching. In FIG. 1, the exemplary networked environment 100 includes one or more users 110, a network 120, a publisher 130, a tensor factorization based recommendation engine 140, a user tensor database 145, one or more advertisers 150, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. The network 120 may also include various network access points, e.g., wired or wireless access points such as base stations or Internet exchange points 120-1 . . . 120-2, through which a data source may connect to the network 120 in order to transmit information via the network 120.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the publisher 130 and the tensor factorization based recommendation engine 140 through wired or wireless technologies and related operating systems implemented within user-wearable devices (e.g., glasses, wrist watch, etc.).

A user, e.g., the user 110-1, may access and/or view content items published by the publisher 130 and perform online activities with respect to those content items. In one embodiment, the publisher 130 may represent data related to these content items and/or user activities based on tensors, and store these user tensor data into the user tensor database 145.

The tensor factorization based recommendation engine 140 may access information stored in the user tensor database 145 via the network 120. The information in the user tensor database 145 may be generated by one or more different applications (not shown), which may be running on the publisher 130, at the backend of the publisher 130, or as a completely standalone system capable of connecting to the network 120, accessing information from different sources, analyzing the information, generating structured information, and storing such generated information in the user tensor database 145. The user tensor database 145 may include tensor data of different users of the publisher 130. For example, the user tensor database 145 may store personal information of the users and features of different content items of the publisher 130, both in form of tensors.

The tensor factorization based recommendation engine 140 may receive a request for recommending content items to a user, either from the publisher 130 or directly from the user. Based on the request, the tensor factorization based recommendation engine 140 may obtain tensor data from the user tensor database 145. The tensor factorization based recommendation engine 140 can decompose the tensor data into a plurality of sub-tensors based on a prior probability distribution. In one embodiment, the tensor factorization based recommendation engine 140 may determine at least one bound for a tensor factorization model that is generated based on the prior probability distribution, predict one or more items interesting to the user based on the at least one bound and the plurality of sub-tensors, and recommend at least one of the one or more items to the user as a response to the request.

The content sources 160 in the exemplary networked environment 100 include multiple content sources 160-1 . . . 160-2. A content source 160 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The publisher 130 may access information from any of the content sources 160-1 . . . 160-2. For example, the publisher 130 may fetch content items from a content source and publish the content items to users, either based on a user request or based on recommendation determination from the tensor factorization based recommendation engine 140.

Figure 2:
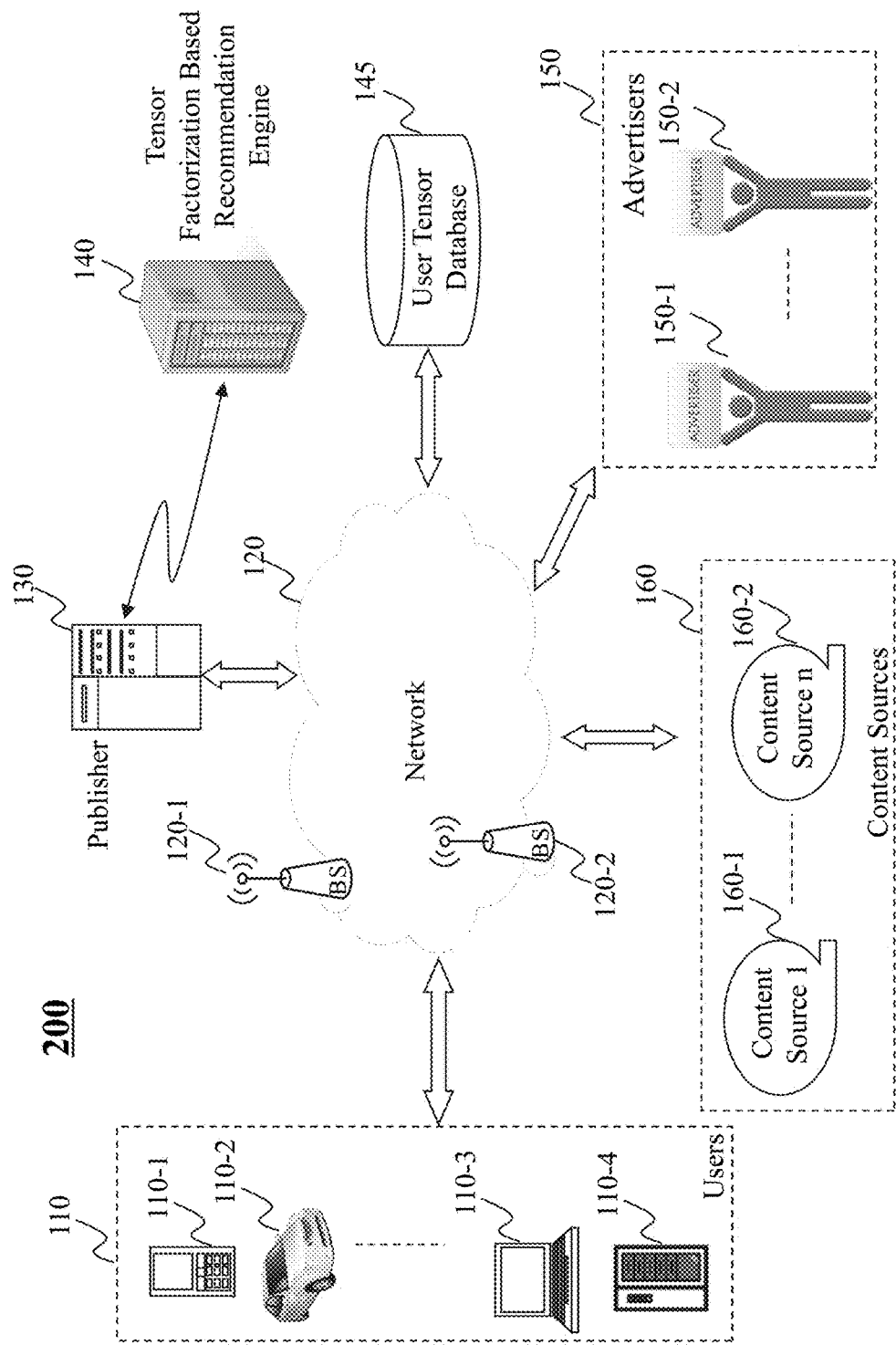
FIG. 2 is a high level depiction of another exemplary networked environment for recommending content items to a user based on tensor factorization, according to an embodiment of the present teaching.

FIG. 2 is a high level depiction of another exemplary networked environment 200 for recommending content items to a user based on tensor factorization, according to an embodiment of the present teaching. The exemplary networked environment 200 in this embodiment is similar to the exemplary networked environment 100 in FIG. 1, except that the tensor factorization based recommendation engine 140 serves as a backend system for the publisher 130.

Figure 3:
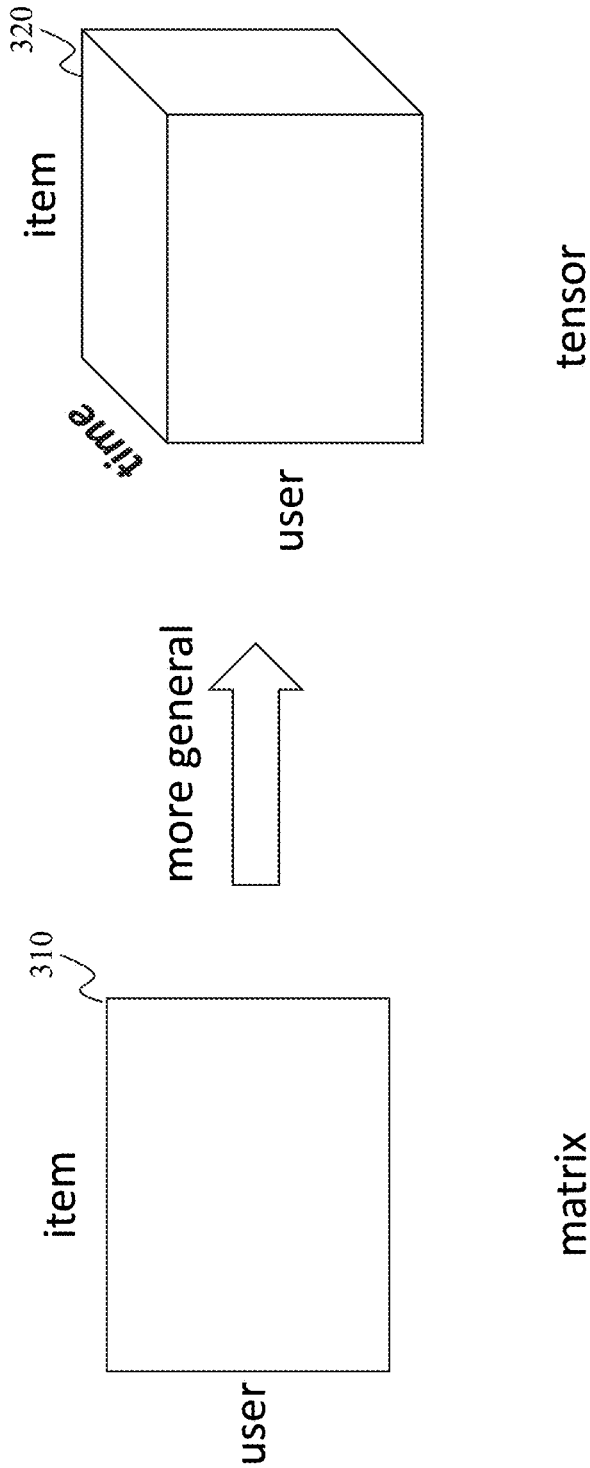
FIG. 3 illustrates exemplary tensor formats for representing data related to users and items, according to an embodiment of the present teaching.

FIG. 3 illustrates exemplary tensor formats for representing data related to users and items, according to an embodiment of the present teaching. As shown in FIG. 3, while a matrix 310 can represent binary interactions between user and item; a tensor 320 can represent triple or higher order interactions among user, item, and e.g. time, location, price, etc. As such, a tensor is a more general representation of data compared to a matrix. In this big data era, more and more data have multiple aspects and include very high order interactions and relationships among different aspects, and are thus proper to be represented by tensors, especially when the relationships are complex and nonlinear. For example, tensor data (user, ad, publisher, page section) can represent online ads click logs; tensor data (person, medicine, biomarker, time) can represent drug tests; tensor data (user, source file, action) can represent code repository; tensor data (people, product, time) can represent online transactions.

Figure 4:
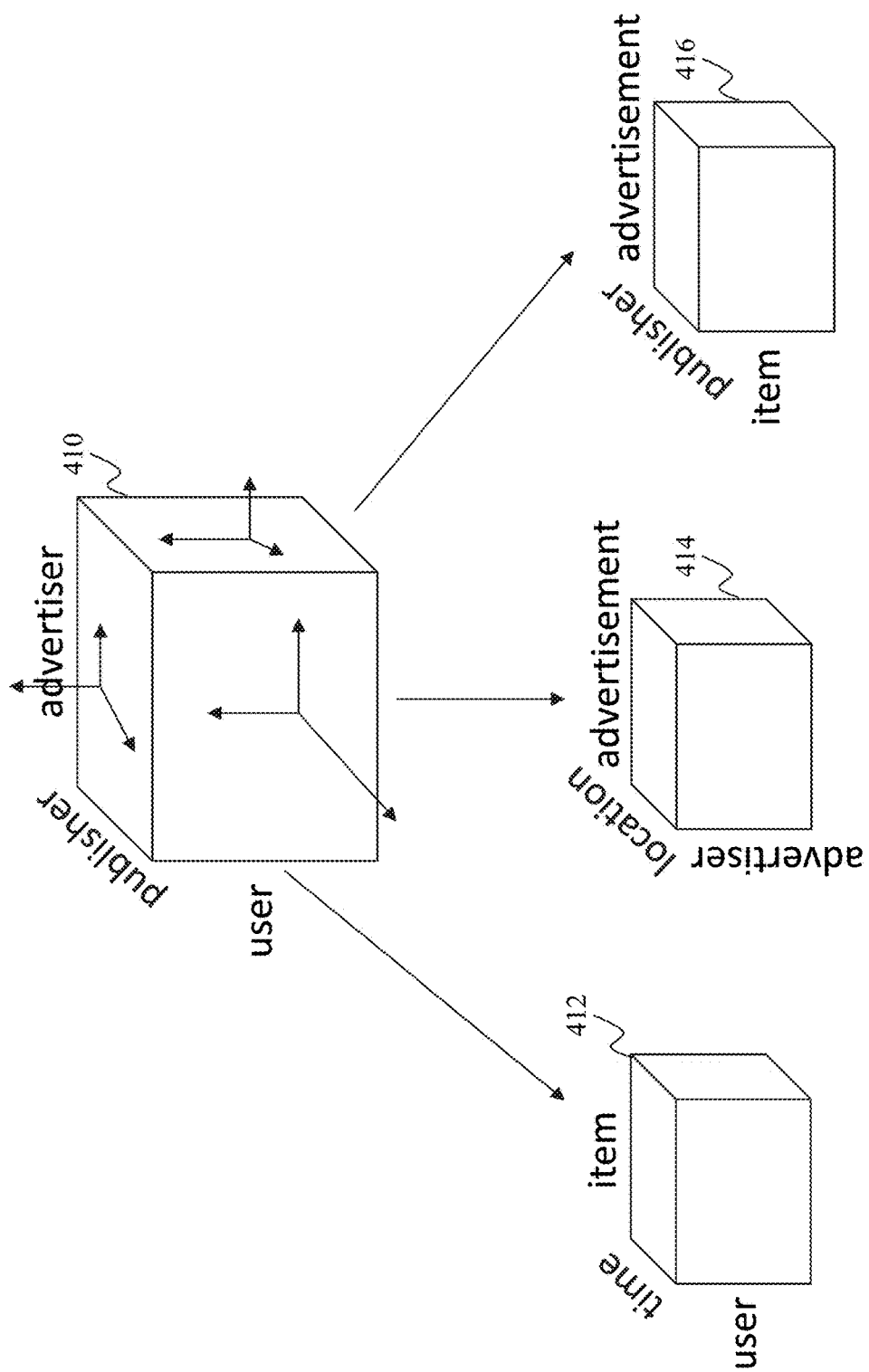
FIG. 4 illustrates components of a multi-order tensor, according to an embodiment of the present teaching.

FIG. 4 illustrates components of a multi-order tensor 410, according to an embodiment of the present teaching. As shown in FIG. 4, the multi-order tensor 410 includes components like user, publisher, and advertiser. In one embodiment, the multi-order tensor 410 may decomposed into multiple sub-tensors 412, 414, 416. For example, the sub-tensor 412 includes components of user, time, item; the sub-tensor 414 includes components of advertiser, location, advertisement; and the sub-tensor 416 includes components of item, publisher, and advertisement. It can be understood that the sub-tensors 412, 414, 416 may be further decomposed in various situations.

Figure 5:
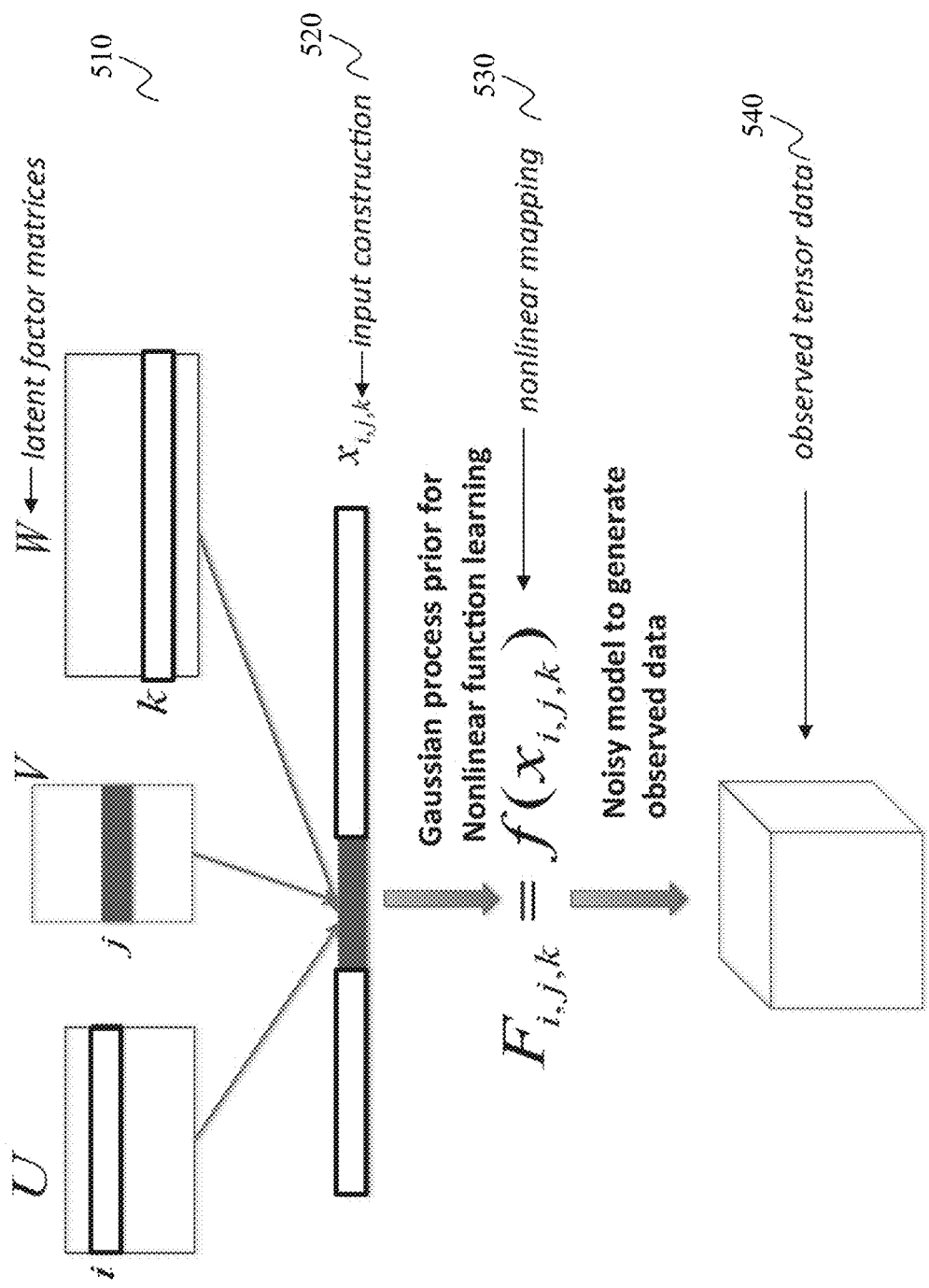
FIG. 5 illustrates an exemplary process for a distributed flexible nonlinear tensor factorization, according to an embodiment of the present teaching.

FIG. 5 illustrates an exemplary process for a distributed flexible nonlinear tensor factorization, according to an embodiment of the present teaching. As shown in FIG. 5, the process may include generating latent factors based on a multi-mode tensor and choose a set of tensor entries of the multi-mode tensor, at 510. Then, for each entry in the chosen set, the system can construct an input at 520 by concatenating latent factors corresponding to the entry from all modes/matrices of the multi-mode tensor. Then, the system can estimate a nonlinear function at 530 by assigning a Gaussian process as the prior probability distribution over the nonlinear function. As such, the system can determine a multivariate Gaussian distribution of function values calculated based on the nonlinear function and the multi-mode tensor. The system may sample observed entries at 540 based on a noise model to generate observed data that follows a flexible Gaussian process (GP) tensor factorization model.

Figure 6:
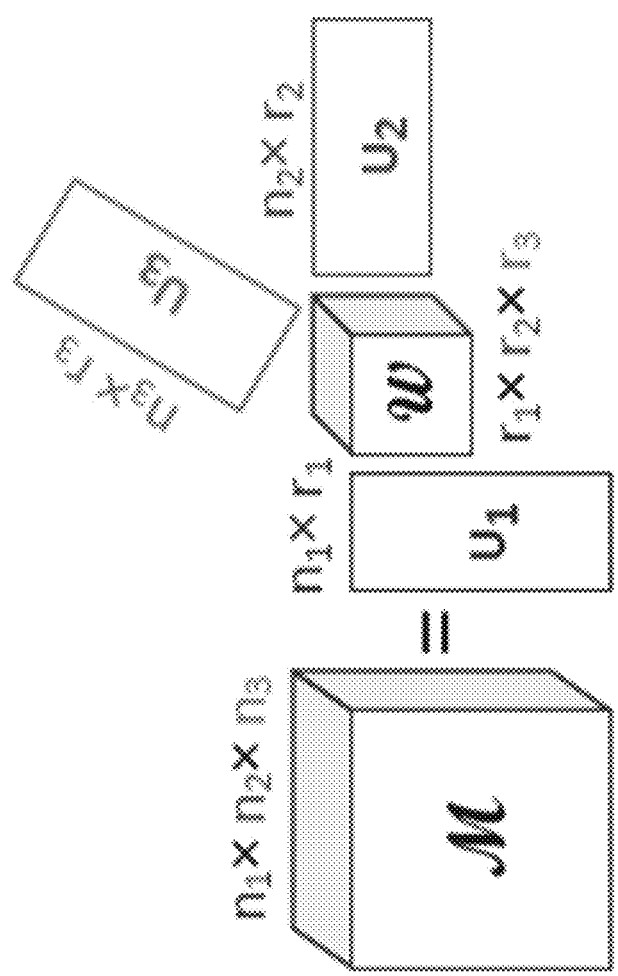
FIG. 6 illustrates a decomposition on a 3-mode tensor, according to an embodiment of the present teaching.

FIG. 6 illustrates a decomposition on a 3-mode tensor M, according to an embodiment of the present teaching. As shown in FIG. 6, the core tensor W is multiplied by matrices U1, U2 and U3 on different dimensions to obtain the tensor M. In turn, the 3-mode tensor M can be decomposed or factorized into the core tensor W, and the matrices U1, U2, U3.

Figure 7:
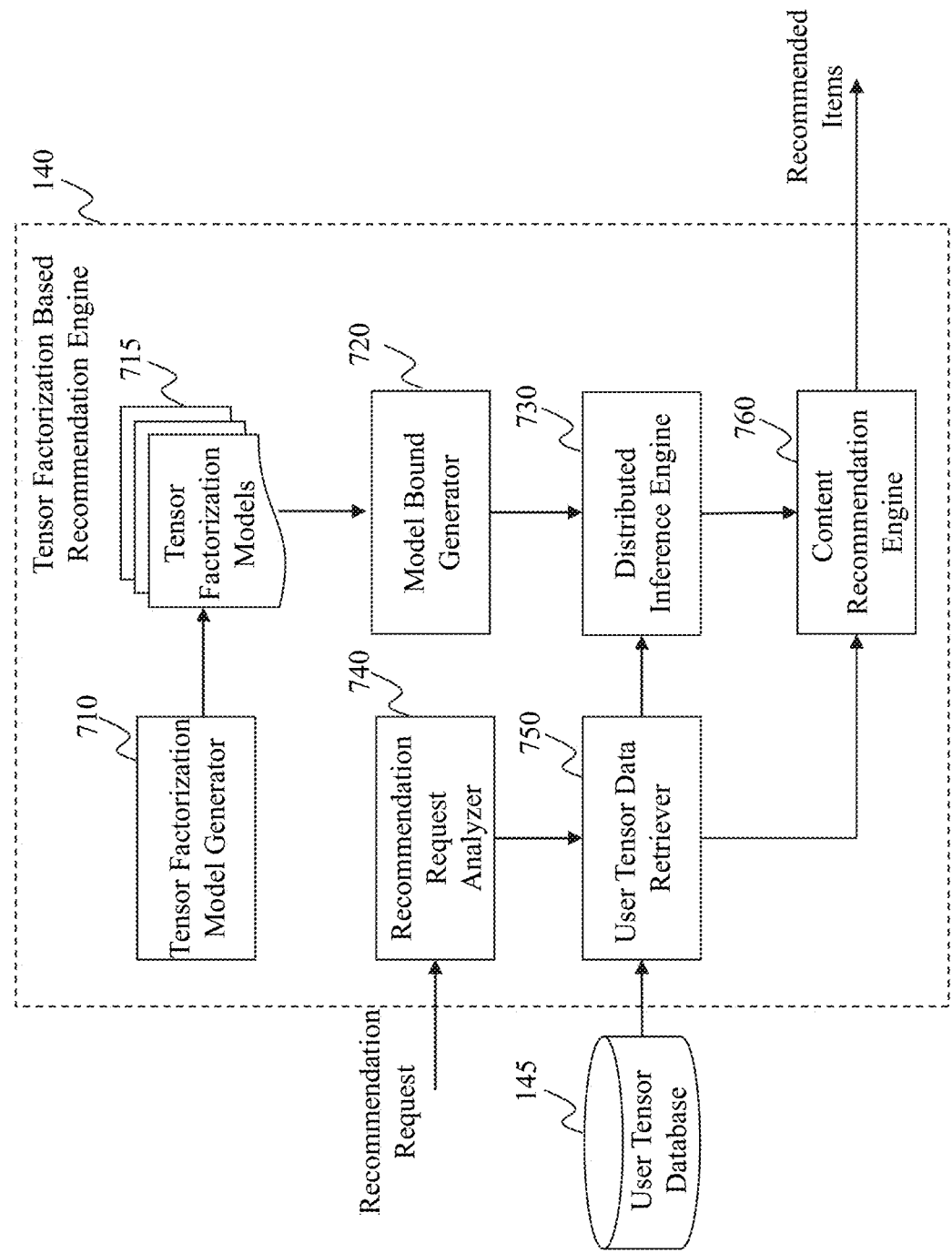
FIG. 7 illustrates an exemplary diagram of a tensor factorization based recommendation engine, according to an embodiment of the present teaching.

FIG. 7 illustrates an exemplary diagram of a tensor factorization based recommendation engine 140, according to an embodiment of the present teaching. The tensor factorization based recommendation engine 140 in this example includes a tensor factorization model generator 710, one or more tensor factorization models 715, a model bound generator 720, a distributed inference engine 730, a recommendation request analyzer 740, a user tensor data retriever 750, and a content recommendation engine 760.

The tensor factorization model generator 710 in this example may generate and store the tensor factorization models 715, e.g. following the process shown in FIG. 5. This may be performed offline based on large scale of tensor data.

The model bound generator 720 in this example may retrieve one of the tensor factorization models 715 and generate one or more bounds for the tensor factorization model. In one embodiment, a bound may be a tractable variational evidence lower bound that has a closed-form expression. The model bound generator 720 may send the bound to the distributed inference engine 730 for predicting items interesting to a user.

The recommendation request analyzer 740 in this example may receive and analyze a recommendation request, either from the publisher 130 or directly from a user. The recommendation request is a request for recommending one or more content items to the user. The recommendation request analyzer 740 may send the analyzed request to the user tensor data retriever 750 for obtaining tensor data related to the user.

The user tensor data retriever 750 in this example may receive the analyzed request from the recommendation request analyzer 740 and retrieve user tensor data of the user from the user tensor database 145. The user tensor data retriever 750 may send the retrieved user tensor data to the distributed inference engine 730 for predicting items interesting to the user; and to the content recommendation engine 760 for recommending content items to the user as a response to the request.

The distributed inference engine 730 in this example may receive the bound for the tensor factorization model from the model bound generator 720; and receive the retrieved user tensor data from the user tensor data retriever 750. The distributed inference engine 730 can predict items interesting to the user based on the bound of the tensor factorization model and the retrieved user tensor data. This prediction can be simple and efficient by making use of the closed-form expression of the bound. This prediction may be more accurate when the bound is tighter, i.e. having a closer performance to the real performance of the tensor factorization model. The distributed inference engine 730 may send the predicted items to the content recommendation engine 760 for recommending content items to the user as a response to the request.

The content recommendation engine 760 in this example may receive the predicted items from the distributed inference engine 730, and receive the retrieved user tensor data from the user tensor data retriever 750. The content recommendation engine 760 can select one or more of the predicted items based on the retrieved user tensor data, e.g. based on the user's personal information, the user's historical online activities, etc. The content recommendation engine 760 may then recommend the selected content item (s) to the user as a response to the request.

Figure 8:
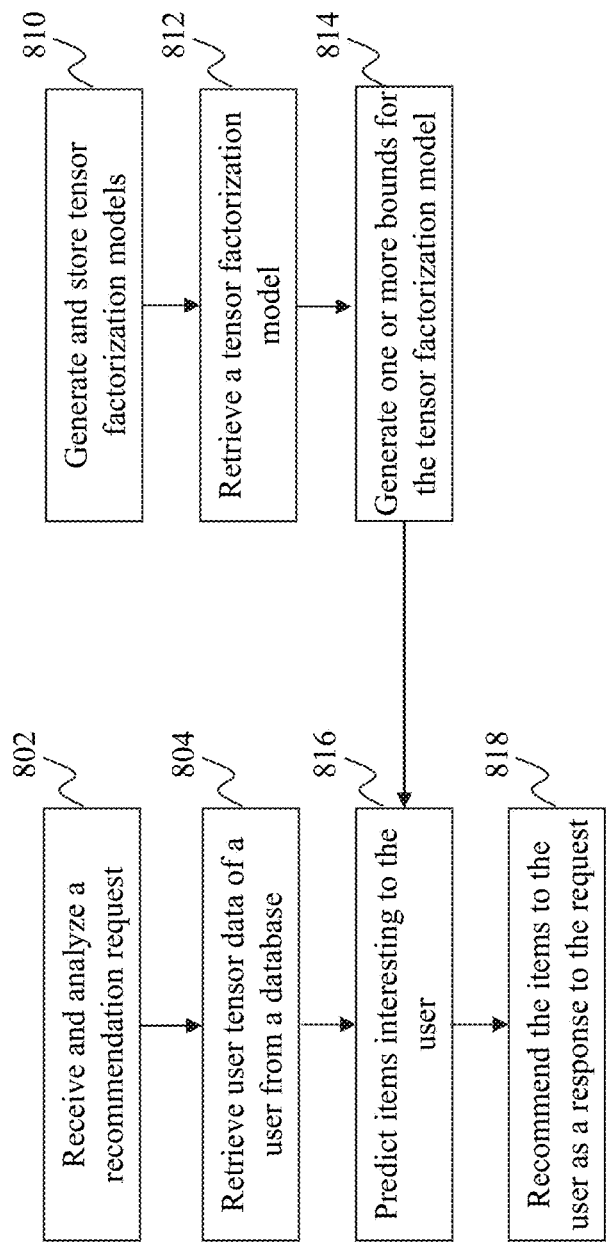
FIG. 8 is a flowchart of an exemplary process performed by a tensor factorization based recommendation engine, according to an embodiment of the present teaching.

FIG. 8 is a flowchart of an exemplary process performed by a tensor factorization based recommendation engine, e.g. the tensor factorization based recommendation engine 140 in FIG. 7, according to an embodiment of the present teaching. As shown in FIG. 8, a recommendation request is received and analyzed at 802. User tensor data of a user is retrieved at 804 from a database. The process then moves to 816.

In parallel to steps 802 and 804, the tensor factorization based recommendation engine 140 can perform offline operations 810-814. At 810, tensor factorization models are generated and stored. A tensor factorization model is retrieved at 812. One or more bounds for the tensor factorization model can be generated at 814. Then, the process moves to 816. It can be understood that in some embodiments, the tensor factorization based recommendation engine 140 may also perform the operations 810-814 online or perform some updates of the tensor factorization model and/or its bounds online.

At 816, items interesting to the user are predicted. Then at 818, one or more items are recommended to the user as a response to the request.

Figure 9:
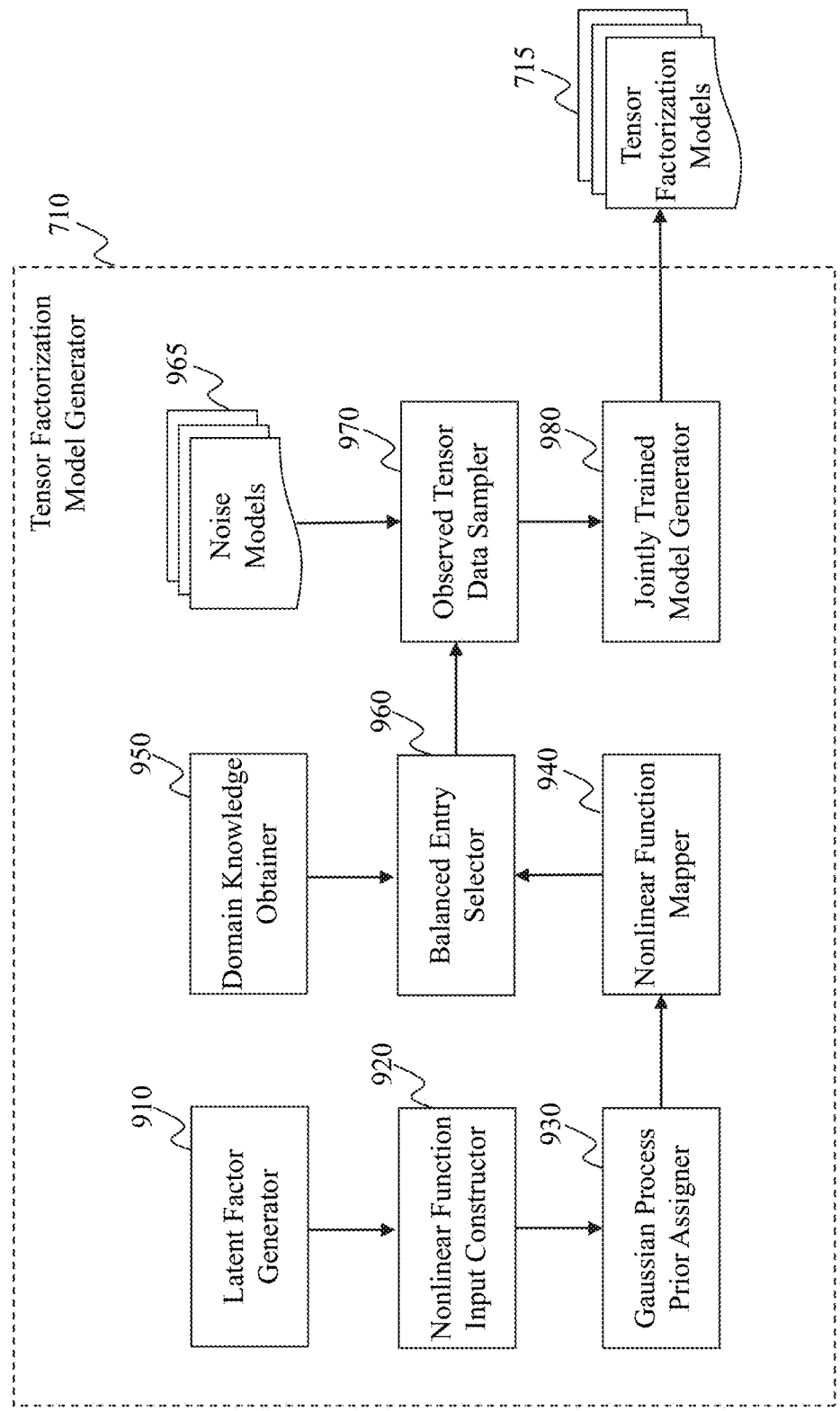
FIG. 9 illustrates an exemplary diagram of a tensor factorization model generator, according to an embodiment of the present teaching.

FIG. 9 illustrates an exemplary diagram of a tensor factorization model generator 710, according to an embodiment of the present teaching. As shown in FIG. 9, the tensor factorization model generator 710 in this example includes a latent factor generator 910, a nonlinear function input constructor 920, a Gaussian process prior assigner 930, a nonlinear function mapper 940, a domain knowledge obtainer 950, a balanced entry selector 960, an observed tensor data sampler 970, one or more noise models 965, and a jointly trained model generator 980.

The latent factor generator 910 in this example may generate latent factors based on a tensor and send the latent factors to the nonlinear function input constructor 920 for constructing inputs. The nonlinear function input constructor 920 in this example may construct inputs for a nonlinear function based on the latent factors, for each tensor entry of the tensor. The nonlinear function input constructor 920 can send the inputs for the nonlinear function to the Gaussian process prior assigner 930 for assigning a Gaussian process prior.

The Gaussian process prior assigner 930 in this example may assign a Gaussian process as a prior probability distribution over the nonlinear function, and send the inputs as well as the Gaussian process prior to the nonlinear function mapper 940 for generating the nonlinear function. The nonlinear function mapper 940 in this example may estimate or learn the nonlinear function based on the inputs constructed by the nonlinear function input constructor 920 and the Gaussian process prior assigned by the Gaussian process prior assigner 930, and map each input nonlinearly to a corresponding tensor entry.

The domain knowledge obtainer 950 in this example may obtain domain knowledge about meaningful entries and send the domain knowledge to the balanced entry selector 960 for entry selection. The balanced entry selector 960 in this example may select entries based on the domain knowledge. As details discussed below, due to the construction of inputs and assignment of Gaussian process prior, the covariance function is free of Kronecker-product structure, and as a result the balanced entry selector 960 can freely choose any subset of tensor elements for the training process and incorporate prior domain knowledge. For example, the balanced entry selector 960 can select a combination of balanced zero and nonzero elements to overcome the learning bias. Then, the balanced entry selector 960 can send the selected entries to the observed tensor data sampler 970 for data sampling.

The observed tensor data sampler 970 in this example may sample observed tensor entries based on one of noise models 965 and send the sampled tensor entries to the jointly trained model generator 980. The jointly trained model generator 980 in this example may generate a tensor factorization model that is jointly trained based on all selected tensor entries. The jointly trained model generator 980 may store each generated tensor factorization model for future content item recommendation.

According to one embodiment, one can denote a K-mode tensor by $M \in \mathbb{R}^{d_1 \times \cdots \times d_K}$, where the k-th mode is of dimension $d_k$. The tensor entry at location i (i=($i_1, \ldots, i_K$)) is denoted by $m_i$. To generalize matrix-matrix products to tensor-matrix products, a tensor $W \in \mathbb{R}^{r_1 \times \cdots \times r_K}$ can multiply with a matrix $U \in \mathbb{R}^{s \times t}$ at mode k when its dimension at mode-k is consistent with the number of columns in U, i.e., $r_k = t$. The product is a new tensor, with size $r_1 \times \cdots \times r_{k-1} \times s \times r_{k+1} \times \cdots \times r_K$. Each element is calculated by $$(W \times_k U)_{i_1 \ldots i_{k-1} j i_{k+1} \ldots i_K} = \sum_{i_k=1}^{r_k} w_{i_1 \ldots i_K} u_{j i_k}.$$

A Tucker decomposition model uses a latent factor matrix $U_k \in \mathbb{R}^{d_k \times r_k}$ in each mode k and a core tensor $W \in \mathbb{R}^{r_1 \times \cdots \times r_K}$ and assumes the whole tensor M is generated by $M = W \times_1 U^{(1)} \times_2 \ldots \times_K U^{(K)}$. This is a multilinear function of W and $\{U_1, \ldots, U_K\}$. It can be further simplified by restricting $r_1 = r_2 = \ldots = r_K$ and the off-diagonal elements of W to be 0. In this case, the Tucker model becomes CANDECOMP/PARAFAC (CP).

The infinite Tucker decomposition (InfTucker) generalizes the Tucker model to infinite feature space via a tensor-variate Gaussian process (TGP). In a probabilistic framework, one can assign a standard normal prior over each element of the core tensor W, and then marginalize out W to obtain the probability of the tensor given the latent factors:

$$p(M|U_{(1)}, \ldots, U^{(K)}) = N(\text{vec}(M); 0, \Sigma^{(1)} \otimes \ldots \otimes \Sigma^{(K)}) \quad (1)$$

where vec(M) is the vectorized whole tensor, $\Sigma^{(k)} = U^{(k)} U^{(k)T}$ and $\otimes$ is the Kronecker-product. Next, one may apply the kernel trick to model nonlinear interactions between the latent factors: Each row $u_t^k$ of the latent factors $U^{(k)}$ is replaced by a nonlinear feature transformation $\phi(u_t^k)$ and thus an equivalent nonlinear covariance matrix $\Sigma^{(k)} = k(U^{(k)}, U^{(k)})$ is used to replace $U^{(k)} U^{(k)T}$, where k(•,•) is the covariance function. After the nonlinear feature mapping, the original Tucker decomposition is performed in an (unknown) infinite feature space. Further, since the covariance of vec(M) is a function of the latent factors $\mathcal{U} = \{U^{(1)} \ldots U^{(K)}\}$, Equation (1) actually defines a Gaussian process (GP) on tensors, namely tensor-variate GP (TGP), where the input are based on $\mathcal{U}$. Finally, one can use different noisy models p(Y|M) to sample the observed tensor Y. For example, one can use Gaussian models and Probit models for continuous and binary observations, respectively.

Despite being able to capture nonlinear interactions, InfTucker may suffer from the extreme sparsity issue in real-world tensor data sets. The reason is that its full covariance is a Kronecker-product between the covariances over all the modes—$\{\Sigma^{(1)}, \ldots, \Sigma^{(K)}\}$ (see Equation (1)). Each $\Sigma^{(k)}$ is of size $d_k \times d_k$ and the full covariance is of size $\Pi_k d_k \times \Pi_k d_k$. Thus TGP is projected onto the entire tensor with respect to the latent factors $\mathcal{U}$, including all zero and nonzero elements, rather than a (meaningful) subset of them. However, the real-world tensor data are usually extremely sparse, with a huge number of zero entries and a tiny portion of nonzero entries. On one hand, because most zero entries are meaningless-they are either missing or unobserved, using them can adversely affect the tensor factorization quality and lead to biased predictions; on the other hand, incorporating numerous zero entries into GP models will result in large covariance matrices and high computational costs.

The present teaching discloses a flexible Gaussian process tensor factorization model to address the above issue. While inheriting the nonlinear modeling power, the disclosed model disposes of the Kronecker-product structure in the full covariance and can therefore select an arbitrary subset of tensor entries for training.

Specifically, given a tensor $M \in \mathbb{R}^{d_1 \times \cdots \times d_K}$, for each tensor entry $m_i$(i=($i_1, \ldots, i_K$)), the disclosed system can construct an input $x_i$ by concatenating the corresponding latent factors from all the modes: $x_i = [u_{i_1}^{(1)}, \ldots, u_{i_K}^{(K)}]$, where $u_{i_k}^{(k)}$ is the $i_k$-th row in the latent factor matrix $U^{(k)}$ for mode k. One can assume that there is an underlying function f:

$$\mathbb{R}^{\Sigma_{j=1}^K d_j} \to \mathbb{R} \ su$$

such that $m_i = f(x_i) = f([u_{i_1}^{(1)}, \ldots, u_{i_K}^{(K)}])$. This function is unknown and can be complex and nonlinear. To learn the function, the system can assign a Gaussian process prior over f: for any set of tensor entries $S = \{i_1, \ldots, i_N\}$, the function values $f_S = \{f(x_{i_1}), \ldots, f(x_{i_N})\}$ are distributed according to a multivariate Gaussian distribution with mean 0 and covariance determined by $X_S = \{x_{i_1}, \ldots, x_{i_N}\}$:

$$p(f_S | \mathcal{U}) = N(f_S | 0, k(X_S, X_S))$$

where k(.,.) is a (nonlinear) covariance function.

Because $k(x_i, x_j) = k([u_{i_1}^{(1)}, \ldots, u_{i_K}^{(K)}], [u_{j_1}^{(1)}, \ldots, u_{j_K}^{(K)}])$, there is no Kronecker-product structure constraint and so any subset of tensor entries can be selected for training. To prevent the learning process to be biased toward zero, one can use a set of entries with balanced zeros and nonzeros. Furthermore, useful domain knowledge can also be incorporated to select meaningful entries for training. From the modeling perspective, the disclosed model is more general than InfTucker.

The system can further assign a standard normal prior over the latent factors $\mathcal{U}$. Given the selected tensor entries $m=[m_{i_1}, \ldots, m_{i_N}]$, the observed entries $y=[y_{i_1}, \ldots, y_{i_N}]$ are sampled from a noise model $p(y|m)$. In this paper, one can deal with both continuous and binary observations. For continuous data, the system can use the Gaussian model, $p(y|m)=N(y|m), \beta^{-1}I)$ and the joint probability is $$p(y, m, \mathcal{U}) = \prod_{t=1}^{K} N(vec(U^{(t)})|0, I)N(m|0, k(X_S, X_S))N(y|m, \beta^{-1}I) \quad (2)$$

where $S=[i_1, \ldots, i_N]$. For binary data, the system can use the Probit model in the following manner. One can introduce augmented variables $z=[z_1, \ldots, z_N]$ and then decompose the Probit model into $p(z_j|m_{i_j})=N(z_j|m_{i_j}, 1)$ and $p(y_{i_j}|z_j) = \mathbb{1}(y_{i_j}=0)\mathbb{1}(z_j \leq 0)+\mathbb{1}(y_{i_j}=1)\mathbb{1}(z_j>0)$ where $\mathbb{1}(\bullet)$ is the indicator function. Then the joint probability is $$p(y, z, m, \mathcal{U}) = \prod_{t=1}^{K} N(vec(U^{(t)})|0, I)N(m|0, k(X_S, X_S)) \quad (3)$$

$$N(z|m, I) \cdot \prod_j \mathbb{1}(y_{i_j} = 0)\mathbb{1}(z_j \leq 0) + \mathbb{1}(y_{i_j} = 1)\mathbb{1}(z_j > 0).$$

Figure 10:
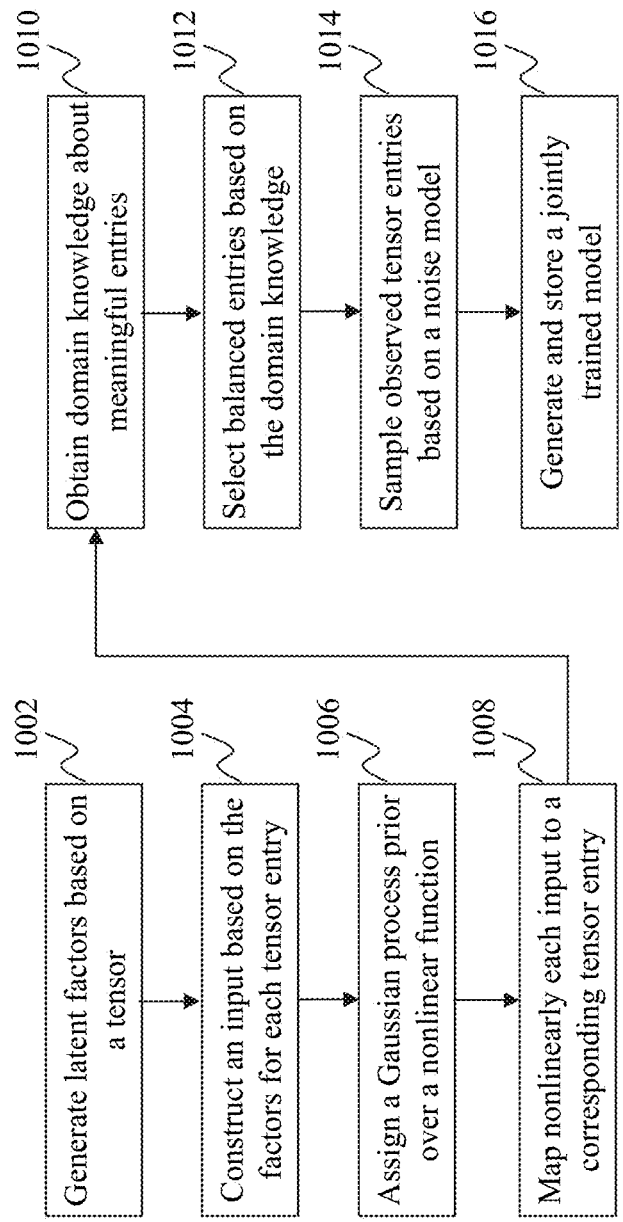
FIG. 10 is a flowchart of an exemplary process performed by a tensor factorization model generator, according to an embodiment of the present teaching.

FIG. 10 is a flowchart of an exemplary process performed by a tensor factorization model generator, e.g. the tensor factorization model generator 710 in FIG. 9, according to an embodiment of the present teaching. As shown in FIG. 10, latent factors are generated at 1002 based on a tensor. An input is constructed at 1004 based on the latent factors for each tensor entry. A Gaussian process prior is assigned at 1006 over a nonlinear function. At 1008, each input is mapped nonlinearly to a corresponding tensor entry according to the nonlinear function.

Domain knowledge about meaningful entries may be obtained at 1010. Balanced entries are selected at 1012 based on the domain knowledge. Observed tensor entries are sampled at 1014 based on a noise model. A tensor factorization model is jointly trained and stored at 1016 for future content item recommendation.

Figure 11:
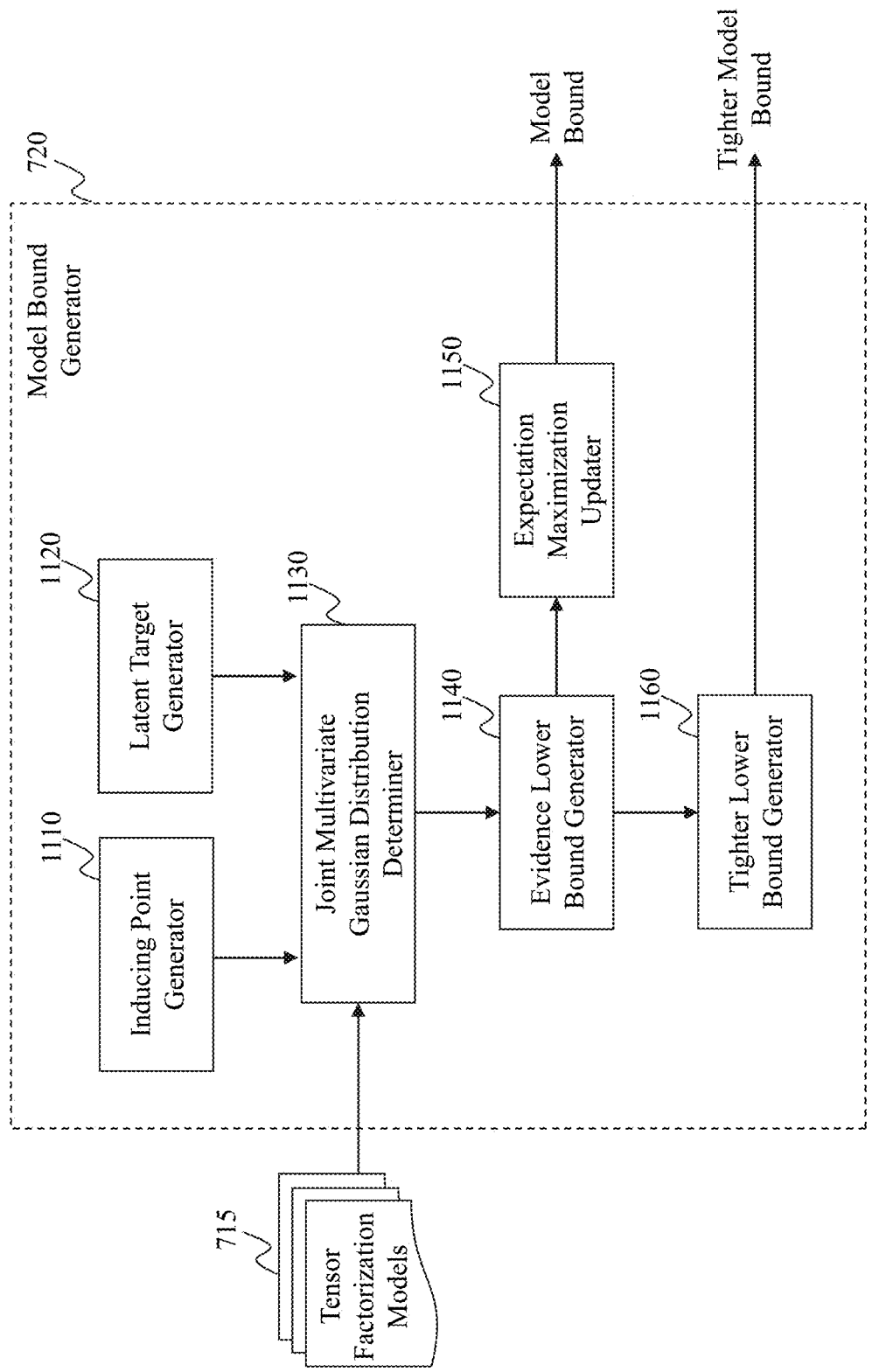
FIG. 11 illustrates an exemplary diagram of a model bound generator, according to an embodiment of the present teaching.

FIG. 11 illustrates an exemplary diagram of a model bound generator 720, according to an embodiment of the present teaching. As shown in FIG. 11, the model bound generator 720 in this example includes an inducing point generator 1110, a latent target generator 1120, a joint multivariate Gaussian distribution determiner 1130, an evidence lower bound generator 1140, an expectation maximization updater 1150, and a tighter lower bound generator 1160.

The inducing point generator 1110 in this example may generate a set of inducing points and send them to the joint multivariate Gaussian distribution determiner 1130 for determining a joint multivariate Gaussian distribution. The latent target generator 1120 in this example may generate latent targets and send them to the joint multivariate Gaussian distribution determiner 1130 for determining a joint multivariate Gaussian distribution.

The joint multivariate Gaussian distribution determiner 1130 in this example may receive the inducing points from the inducing point generator 1110 and receive the latent targets from the latent target generator 1120. In addition, the joint multivariate Gaussian distribution determiner 1130 may retrieve one of the tensor factorization models 715 to augment the model with a joint multivariate Gaussian distribution of latent tensor entries and targets. The joint multivariate Gaussian distribution determiner 1130 may send the joint multivariate Gaussian distribution, which may be a conditional Gaussian distribution, to the evidence lower bound generator 1140 for generating a tractable evidence lower bound for the model.

The evidence lower bound generator 1140 in this example may construct the tractable evidence lower bound for the model based on the conditional Gaussian distribution received from the joint multivariate Gaussian distribution determiner 1130, e.g. by using Jensen's inequality. In one embodiment, the lower bound for the model generated at the evidence lower bound generator 1140 has a closed-form expression, which enables efficient update and optimization for the bound. The evidence lower bound generator 1140 may also determine whether a tighter bound is needed for the model or not. In one embodiment, the tighter bound for the tensor factorization model can avoid a sequential expectation-maximization updates to perform decoupled, highly efficient parallel inference.

When the evidence lower bound generator 1140 determines that no tighter bound is needed, the evidence lower bound generator 1140 may send the lower bound to the expectation maximization updater 1150 for expectation-maximization optimization. The expectation maximization updater 1150 in this example may optimize parameters related to the lower bound for model inference. Then, the expectation maximization updater 1150 may send the optimized model bound to the distributed inference engine 730 for predicting or inferring items interesting to a user.

When the evidence lower bound generator 1140 determines that a tighter bound is needed, the evidence lower bound generator 1140 may send the lower bound to the tighter lower bound generator 1160 for generating a tighter tractable bound for the model. As discussed below in detail, in one embodiment, the tighter bound generated at the tighter lower bound generator 1160 may include additive forms of terms, which enables efficient computation of the tighter tractable evidence lower bounds and their gradients performed in parallel. Then, the tighter lower bound generator 1160 may send the tighter model bound to the distributed inference engine 730 for predicting or inferring items interesting to a user.

In some embodiments, tensors may comprise a large number of entries, say, millions of non-zeros and billions of zeros, making exact inference of the above model intractable. To address this issue, the present teaching discloses a distributed variational inference algorithm, presented as follows.

Since the GP covariance term—$k(X_S, X_S)$ (see Equations (2) and (3)) intertwines all the latent factors, exact inference in parallel is quite difficult. Therefore, one can first derive a tractable variational evidence lower bound (ELBO). The key idea is to introduce a small set of inducing points $B=\{b_1, \ldots, b_p\}$ and latent targets $v=\{v_1, \ldots, v_p\}$ ($p \ll N$). Then one can augment the original model with a joint multivariate Gaussian distribution of the latent tensor entries m and targets v, $p(m, v|\mathcal{U}, B)=N([m, v]^T|[0,0]^T, [K_{SS}, K_{SB}; K_{BS}, K_{BB}])$ where $K_{SS}=k(X_S, X_S)$, $K_{BB}=k(B, B)$, $K_{SB}=k(X_S,$ B) and $K_{BS}=k(B, X_S)$. One can use Jensen's inequality and conditional Gaussian distributions to construct the ELBO. One can obtain a tractable ELBO for the above tensor factorization model on continuous data, $\log(p(y, \mathcal{U}|B)) \geq L_1(\mathcal{U}, B, q(v))$, where $$L_1(\mathcal{U}, B, q(v)) = \log(p(\mathcal{U})) + \int q(v) \log \frac{p(v|B)}{q(v)} dv + \sum_j \int q(v) F_v(y_{i_j}, \beta) dv. \quad (4)$$

Here $p(v|B)=N(v|0, K_{BB})$, $q(v)$ is the variational posterior for the latent targets $v$ and $F_v(\bullet, *) = \int \log(N(\bullet_j|m_{i_j}, *))N(m_{i_j}|\mu_j, \sigma_j^2)dm_{i_j}$, where $\mu_j = k(x_{i_j}, B)K_{BB}^{-1}v$ and $\sigma_j^2 = \Sigma(j, j) = k(x_{i_j}, x_{i_j}) - k(x_{i_j}, B)K_{BB}^{-1}k(B, x_{i_j})$. Note that $L_1$ is decomposed into a summation of terms involving individual tensor entries $i_j (1 \leq j \leq N)$. The additive form enables the system to distribute the computation across multiple computers.

For binary data, one can introduce a variational posterior $q(z)$ and make the mean-field assumption that $q(z)=\Pi_j q(z_j)$. Following a similar derivation to the continuous case, one can obtain a tractable ELBO for binary data, $\log(p(y, \mathcal{U}B)) \geq L_2(\mathcal{U}, B, q(v), q(z))$, where $$L_2(\mathcal{U}, B, q(v), q(z)) = \log(p(\mathcal{U})) + \int q(v) \log \left( \frac{p(v|B)}{q(v)} \right) dv + \sum_j q(z_j) \log \left( \frac{p(y_{i_j}|z_j)}{q(z_j)} \right) + \sum_j \int q(v) \int q(z_j) F_v(z_j, 1) dz_j dv. \quad (5)$$

One can simply use the standard Expectation-maximization (EM) framework to optimize (4) and (5) for model inference, i.e., the E step updates the variational posteriors $\{q(v), q(z)\}$ and the M step updates the latent factors $\mathcal{U}$, the inducing points B and the kernel parameters. However, the sequential E-M updates cannot fully exploit the paralleling computing resources. Due to the strong dependencies between the E step and the M step, the sequential E-M updates may take a large number of iterations to converge. Things become worse for binary case: in the E step, the updates of $q(v)$ and $q(z)$ are also dependent on each other, making a parallel inference even less efficient.

As such, one can further derive tight or tighter ELBOs that subsume the optimal variational posteriors for $q(v)$ and $q(z)$. Thereby one can avoid the sequential E-M updates to perform decoupled, highly efficient parallel inference. Moreover, the inference quality is very likely to be improved using tighter bounds.

For a tight ELBO for continuous tensors, one can take functional derivative of $L_1$ with respect to $q(v)$ in (4). By setting the derivative to zero, one can obtain the optimal $q(v)$ (which is a Gaussian distribution) and then substitute it into $L_1$, manipulating the terms to achieve the following tighter ELBO.

$$\log(p(y, \mathcal{U}|B)) \geq L_1^*(\mathcal{U}, B) = \quad (6)$$

$$\frac{1}{2}\log|K_{BB}| - \frac{1}{2}\log|K_{BB} + \beta A_1| - \frac{1}{2}\beta a_2 - \frac{1}{2}\beta a_3 + \frac{\beta}{2} tr(K_{BB}^{-1}A_1) -$$

$$\frac{1}{2}\sum_{k=1}^{K} \|U^{(k)}\|_F^2 + \frac{1}{2}\beta^2 a_4^\top (K_{BB} + \beta A_1)^{-1} a_4 + \frac{N}{2}\log\left(\frac{\beta}{2\pi}\right),$$

where $\|\bullet\|$ is Frobenius norm, and $A_1 = \Sigma_j k(B, x_{i_j})k(x_{i_j}, B)$, $a_2 = \Sigma_j y_{i_j}^2$, $a_3 = \Sigma_j k(x_{i_j}, x_{i_j})$, $a_4 = \Sigma_j k(B, x_{i_j}) y_{i_j}$.

For a tight ELBO for binary tensors, it is more difficult because $q(v)$ and $q(z)$ are coupled together (see (5)). One can use the following steps: first fix $q(z)$ and plug the optimal $q(v)$ in the same way as the continuous case; then obtain an intermediate ELBO $\hat{L}_2$ that only contains $q(z)$. A quadratic term in $\hat{L}_2$, $$\frac{1}{2}(K_{BS}\langle z \rangle)^T (K_{BB} + A_1)^{-1}(K_{BS}\langle z \rangle),$$

intertwines all $\{q(z_j)\}_j$ in $\hat{L}_2$, making it infeasible to analytically derive or parallelly compute the optimal $\{q(z_j)\}_j$. To overcome this difficulty, one may use the convex conjugate of the quadratic term, and introduce a variational parameter $\lambda$ to decouple the dependences between $\{q(z_j)\}_j$. After that, one can derive the optimal $\{q(z_j)\}_j$ using functional derivatives and obtain the following tight/tighter ELBO.

$$\log(p(y, \mathcal{U}|B)) \geq L_2^*(\mathcal{U}, B, \lambda) = \frac{1}{2}\log|K_{BB}| - \quad (7)$$

$$\frac{1}{2}\log|K_{BB} + A_1| - \frac{1}{2}a_3 + \sum_j \log\left(\Phi\left((2y_{i_j}-1)\lambda^\top k(B, x_{i_j})\right)\right) -$$

$$\frac{1}{2}\lambda^\top K_{BB}\lambda + \frac{1}{2}tr(K_{BB}^{-1}A_1) - \frac{1}{2}\sum_{k=1}^{K} \|U^{(k)}\|_F^2$$

where $\Phi(\bullet)$ is the cumulative distribution function of the standard Gaussian.

As one can see, due to the additive forms of the terms in $L_1^*$ and $L_2^*$, such as $A_1$, $a_2$, $a_3$ and $a_4$, the computation of the tight ELBOs and their gradients can be efficiently performed in parallel.

Given the tighter ELBOs in (6) and (7), the system can utilize a distributed algorithm to optimize the latent factors $\mathcal{U}$, the inducing points B, the variational parameters $\lambda$ (for binary data) and the kernel parameters. One can distribute the computations over multiple computational nodes (Map step) and then collect the results to calculate the ELBO and its gradient (Reduce step). A standard routine, such as gradient descent and L-BFGS, may be used to solve the optimization problem.

For binary data, one can further find that A can be updated with a simple fixed point iteration:

$$\lambda^{(t+1)} = (K_{BB} + A_1)^{-1}(A_1\lambda^{(t)} + a_5) \quad (8)$$

$$\text{where } a_5 = \sum_j k(B, x_{i_j})(2y_{i_j}-1) \frac{N(k(B, x_{i_j})^\top \lambda^{(t)} | 0, 1)}{\Phi(2y_{i_j}-1)k(B, x_{i_j})^\top \lambda^{(t)}}$$

Apparently, the updating can be efficiently performed in parallel (due to the additive structure of $A_1$ and $a_5$). Moreover, the convergence is guaranteed by the following lemma: given $\mathcal{U}$ and B, $L_2^*(\mathcal{U}, B, \lambda^{t+1}) \geq L_2^*(\mathcal{U}, B, \lambda^t)$ and the fixed point iteration (8) always converges.

To use the fixed point iteration, before the system calculates the gradients with respect to $\mathcal{U}$ and B, the system can first optimize λ via (8) in an inner loop. In the outer control, the system may then employ gradient descent or L-BFGS to optimize $\mathcal{U}$ and B. This will lead to an even tighter bound for the disclosed model: $L_2^{**}(\mathcal{U}, B) = \max_\lambda L_2^*(\mathcal{U}, B, \lambda) = \max_{q(v),q(z)} L_2(\mathcal{U}, B, q(v), q(z))$. Empirically, this converges can be faster than feeding the optimization algorithms with ∂λ, ∂$\mathcal{U}$ and ∂B altogether, especially for large data.

The present teaching also presents a detailed design of MapReduce procedures to fulfill the above distributed inference. Basically, the system can first allocate a set of tensor entries on each Mapper t such that the corresponding components of the ELBO and the gradients are calculated; then the Reducer aggregates local results from each Mapper to obtain the integrated, global ELBO and gradient.

One can first consider the standard (key-value) design. For brevity, one can take the gradient computation for the latent factors as an example. For each tensor entry i on a Mapper, the system can calculate the corresponding gradients $\{\partial u_{i_1}^{(1)}, \ldots, \partial u_{i_K}^{(K)}\}$ and then send out the key-value pairs $\{(k, i_k) \to \partial u_{i_k}^{(k)}\}_k$, where the key indicates the mode and the index of the latent factors. The Reducer may aggregate gradients with the same key to recover the full gradient with respect to each latent factor.

Although the (key-value) MapReduce has been successfully applied in numerous applications, it relies on an expensive data shuffling operation: the Reduce step has to sort the Mappers' output by the keys before aggregation. Since the sorting is usually performed on disk due to significant data size, intensive disk I/Os and network communications will become serious computational overheads. To overcome this deficiency, the present teaching devises a key-value-free Map-Reduce scheme to avoid on-disk data shuffling operations. Specifically, on each Mapper, a complete gradient vector may be maintained for all the parameters, including $\mathcal{U}$, B and the kernel parameters; but only relevant components of the gradient, as specified by the tensor entries allocated to this Mapper, will be updated. After updates, each Mapper will then send out the full gradient vector, and the Reducer will simply sum them up together to obtain a global gradient vector without having to perform any extra data sorting. A similar procedure can also be used to perform the fixed point iteration for A in binary tensors.

Efficient MapReduce systems, such as SPARK, can fully optimize the non-shuffling Map and Reduce, where most of the data are buffered in memory and disk I/Os are circumvented to the utmost. By contrast, the performance with data shuffling degrades severely. This can be verified in evaluations: on a small tensor of size 100×100×100, the disclosed key-value-free MapReduce in the present teaching gains 30 times speed acceleration over a traditional key-value process. Therefore, the disclosed algorithm in the present teaching can fully exploit the memory-cache mechanism to achieve fast inference.

The disclosed method also has a lower algorithm complexity than existing methods. Suppose there are N tensor entries for training, with p inducing points and T MAPPER, the time complexity for each Mapper node is $$O\left(\frac{1}{T}p^2 N\right).$$

Since p<<N is a fixed constant (p=100 in the experiments), the time complexity is linear in the number of tensor entries. The space complexity for each Mapper node is $$O\left(\sum_{j=1}^{K} m_j r_j + p^2 + \frac{N}{T}K\right),$$

in order to store the latent factors, their gradients, the covariance matrix on inducing points, and the indices of the latent factors for each tensor entry. Again, the space complexity is linear in the number of tensor entries. In comparison, InfTucker utilizes the Kronecker-product properties to calculate the gradients and has to perform eigenvalue decomposition of the covariance matrices in each tensor mode. Therefore it has a higher time and space complexity and is not scalable to larger dimensions.

Figure 12:
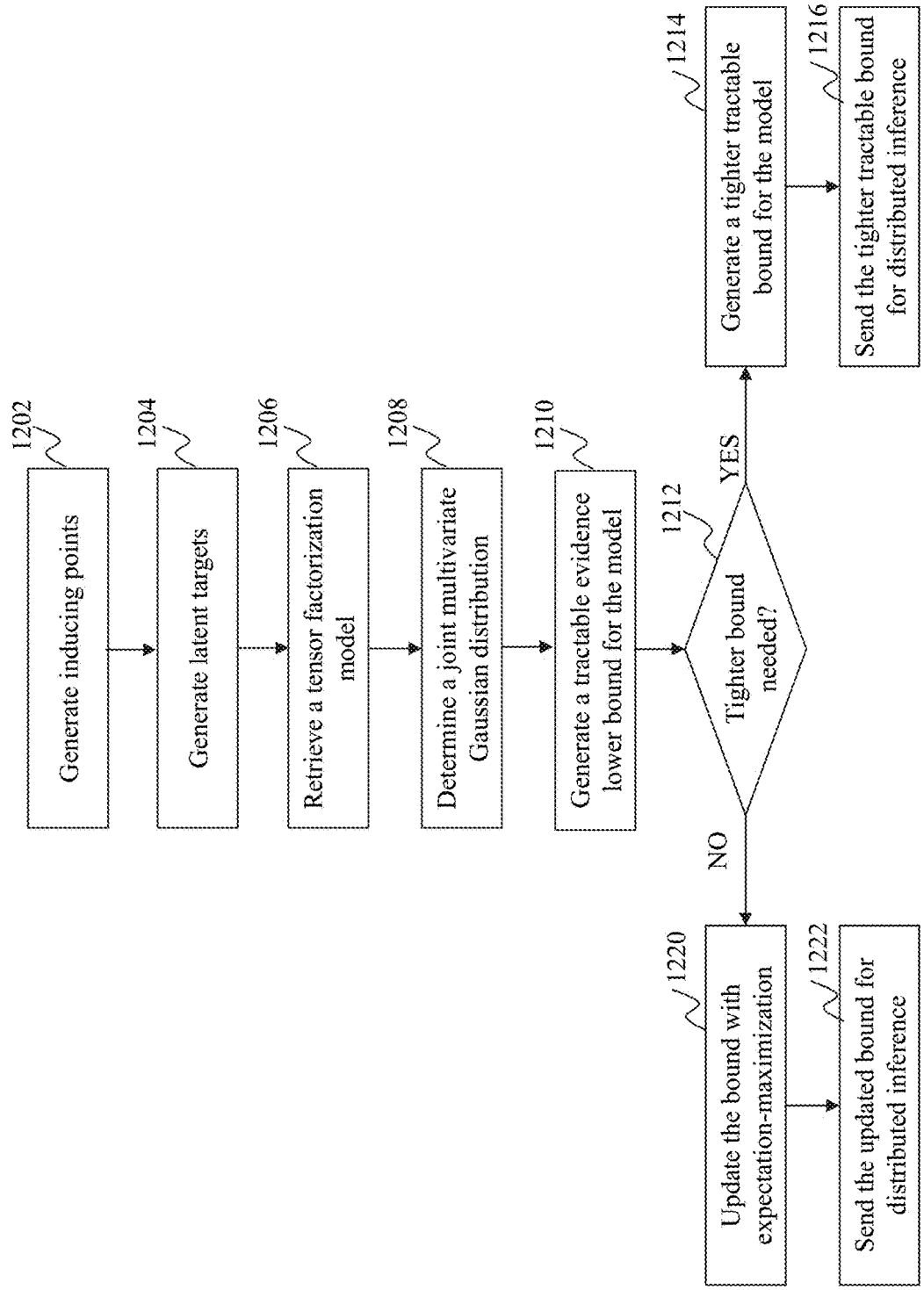
FIG. 12 is a flowchart of an exemplary process performed by a model bound generator, according to an embodiment of the present teaching.

FIG. 12 is a flowchart of an exemplary process performed by a model bound generator, e.g. the model bound generator 720 in FIG. 11, according to an embodiment of the present teaching. As shown in FIG. 12, a set of inducing points are generated at 1202. Latent targets are generated at 1204. A tensor factorization model is retrieved at 1206. A joint multivariate Gaussian distribution is determined at 1208. A tractable evidence lower bound is generated at 1210 for the model.

At 1212, it is determined whether a tighter bound is needed. If so, the process goes to 1214 to generate a tighter tractable bound for the model, and the tighter tractable bound is sent at 1216 for distributed inference. Otherwise, the process goes to 1220 to optimize and update the bound with an expectation-maximization framework, and the updated bound is sent at 1222 for distributed inference.

It can be understood that the order of the steps shown in FIG. 8, FIG. 10, and FIG. 12 may be changed according to different embodiments of the present teaching.

Figure 13:
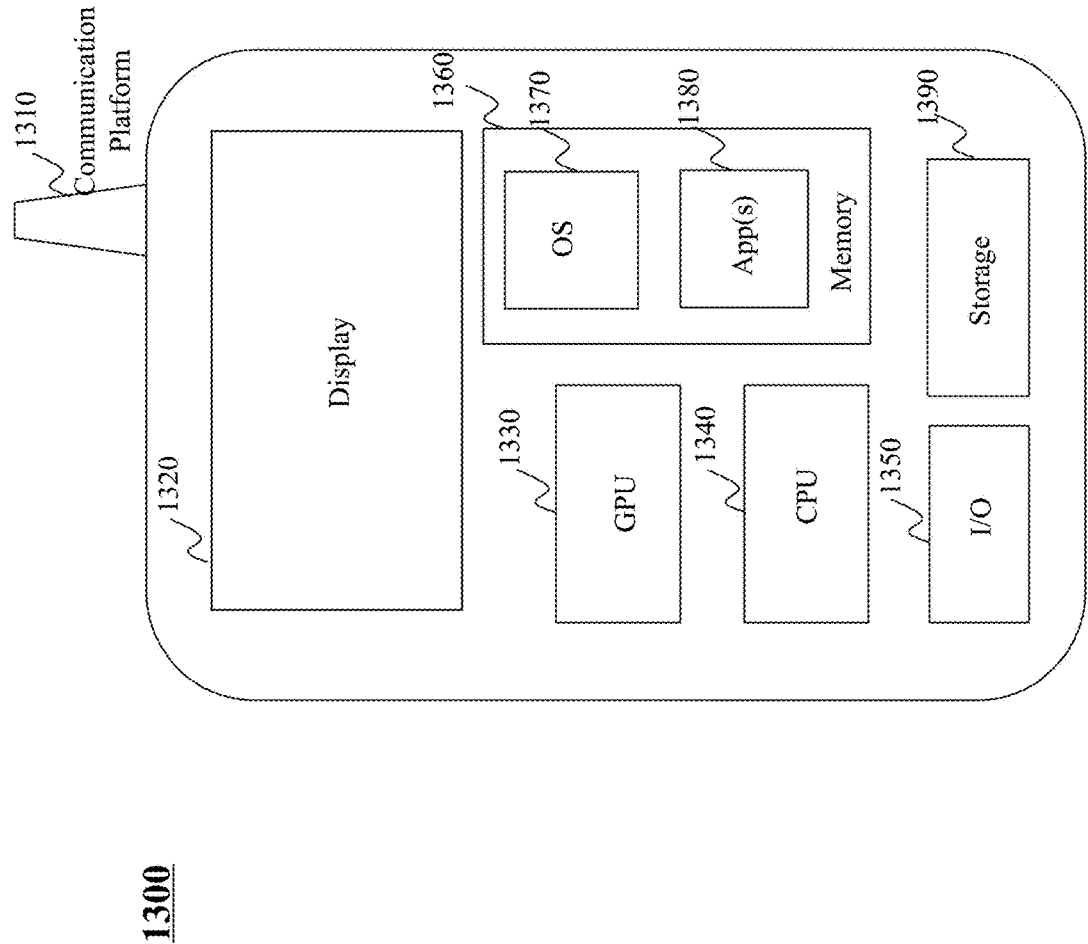
FIG. 13 depicts the architecture of a mobile device which can be used to implement a specialized system incorporating the present teaching.

FIG. 13 depicts the architecture of a mobile device which can be used to realize a specialized system implementing the present teaching. In this example, the user device on which a recommended item is presented and interacted-with is a mobile device 1300, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1340, one or more graphic processing units (GPUs) 1330, a display 1320, a memory 1360, a communication platform 1310, such as a wireless communication module, storage 1390, and one or more input/output (I/O) devices 1350. Any other suitable component, including but not limited to a system bus or a controller (not shown), may also be included in the mobile device 1300. As shown in FIG. 13, a mobile operating system 1370, e.g., iOS, Android, Windows Phone, etc., and one or more applications 1380 may be loaded into the memory 1360 from the storage 1390 in order to be executed by the CPU 1340. The applications 1380 may include a browser or any other suitable mobile apps for receiving content item recommendations on the mobile device 1300. User interactions with the recommended items may be achieved via the I/O devices 1350 and provided to the tensor factorization based recommendation engine 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the tensor factorization based recommendation engine 140, the publisher 130 and/or other components of systems 100 and 200 described with respect to FIGS. 1-12). The hardware elements, operating systems and programming languages of such computers are conventional in nature, and it is presumed that those skilled in the art are adequately familiar therewith to adapt those technologies about recommending content items to a user based on tensor factorization as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
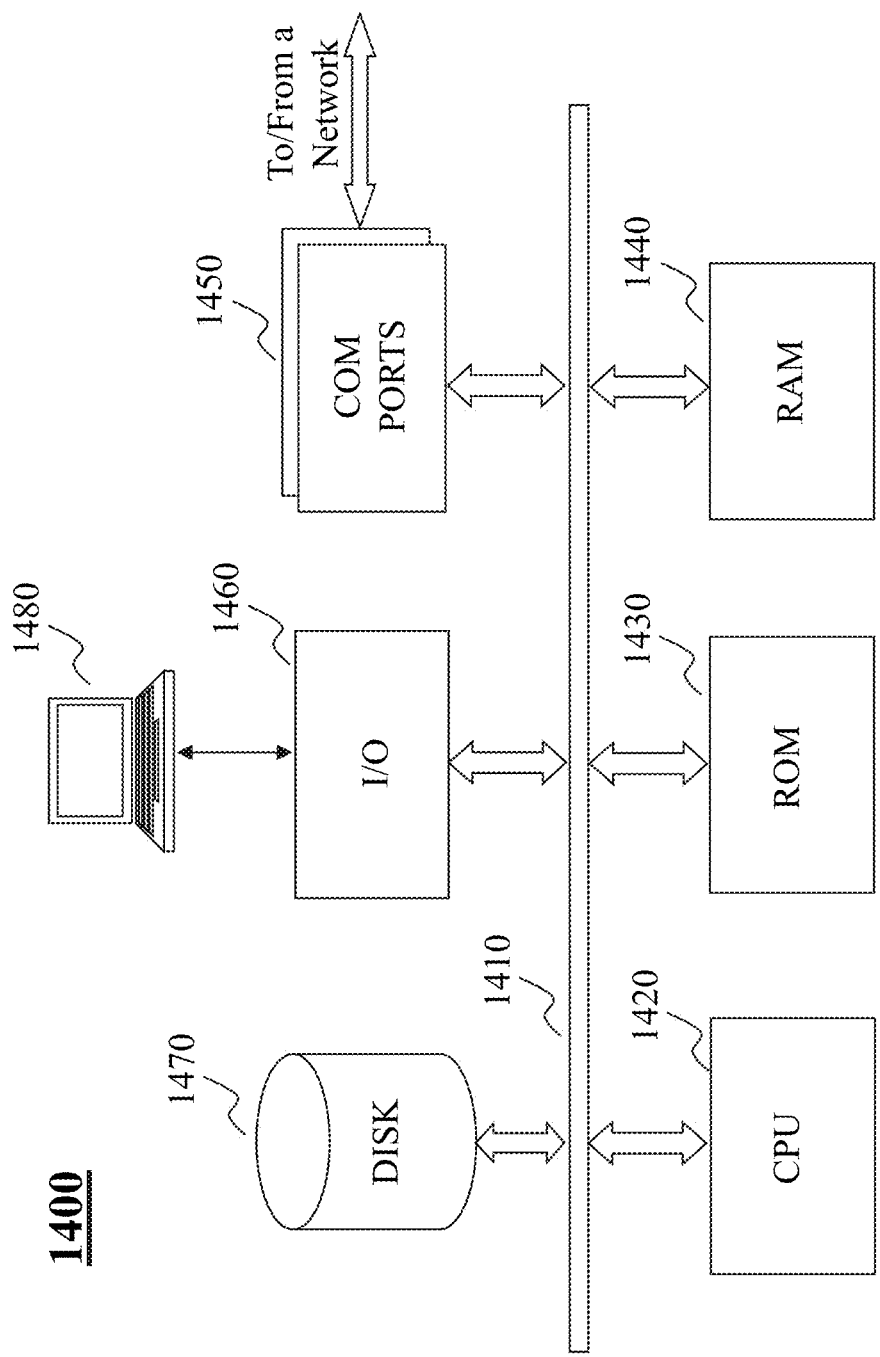
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1400 may be used to implement any component of the techniques of recommending content items to a user based on tensor factorization, as described herein. For example, the publisher 130, the tensor factorization based recommendation engine 140, etc., may be implemented on a computer such as computer 1400, via its hardware, software program, firmware, or a combination thereof. Although only one such computer is shown, for convenience, the computer functions relating to recommending content items to a user based on tensor factorization as described herein may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of recommending content items to a user based on tensor factorization, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with recommending content items to a user based on tensor factorization. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, recommending content items to a user based on tensor factorization as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for recommending content items to a user, the method comprising:
receiving a request for recommending content items to the user;
obtaining tensor data related to a plurality of users and a plurality of content items based on the request;
decomposing the tensor data into a plurality of sub-tensors based on a prior probability distribution;
determining at least one bound for a tensor factorization model that is generated based on the prior probability distribution, wherein a balanced combination of zero and non-zero elements is selected for the tensor factorization model to prevent learning bias, wherein the tensor factorization model is jointly trained based on at least some of the zero and non-zero elements sampled based on a noise model, and wherein at least one of zero elements indicating missing or unobserved tensor entries of a multi-mode tensor is excluded from being used for training the tensor factorization model;
predicting one or more content items interesting to the user based on the at least one bound and the plurality of sub-tensors; and
recommending, to the user as a response to the request, at least one of the one or more content items selected based on user tensor data related to the user.

2. The method of claim 1, further comprising:
generating the tensor factorization model based on a nonlinear function, wherein the nonlinear function is estimated by assigning a Gaussian process as the prior probability distribution over the nonlinear function.

3. The method of claim 2, wherein generating the tensor factorization model comprises:
generating latent factors based on the multi-mode tensor;
constructing an input, for each entry of the multi-mode tensor, by concatenating latent factors corresponding to the entry from all modes of the multi-mode tensor;
determining the nonlinear function by assigning the Gaussian process as the prior probability distribution over the nonlinear function;
determining a multivariate Gaussian distribution of function values calculated based on the nonlinear function and the multi-mode tensor; and
generating the tensor factorization model based on the multivariate Gaussian distribution.

4. The method of claim 3, wherein generating the tensor factorization model further comprises:
obtaining domain knowledge about entries of the multi-mode tensor;
selecting balanced entries based on the domain knowledge, wherein the balanced entries comprise the balanced combination of zero and non-zero elements, wherein the at least some of the zero and non-zero elements comprise observed entries of the multi-mode tensor sampled based on the noise model to generate observed data.

5. The method of claim 1, wherein the at least one bound includes a variational evidence lower bound that has a closed-form expression.

6. The method of claim 5, further comprising:
generating a plurality of inducing points;
obtaining latent tensor entries and latent targets;
augmenting the tensor factorization model with a conditional Gaussian distribution of the latent tensor entries and the latent targets, based on the plurality of inducing points; and
generating the variational evidence lower bound for the tensor factorization model based on the conditional Gaussian distribution.

7. The method of claim 5, further comprising:
generating, based on the variational evidence lower bound, a tighter bound than the variational evidence lower bound for the tensor factorization model, wherein the one or more content items are predicted based on the tighter bound and the plurality of sub-tensors.

8. A system having at least one processor, storage, and a communication platform connected to a network for recommending content items to a user, comprising:
a recommendation request analyzer configured for receiving a request for recommending content items to the user;
a user tensor data retriever configured for obtaining tensor data related to a plurality of users and a plurality of content items based on the request;
a model bound generator configured for determining at least one bound for a tensor factorization model that is generated based on a prior probability distribution, wherein a balanced combination of zero and non-zero elements is selected for the tensor factorization model to prevent learning bias, wherein the tensor factorization model is jointly trained based on at least some of the zero and non-zero elements sampled based on a noise model, and wherein at least one of zero elements indicating missing or unobserved tensor entries of a multi-mode tensor is excluded from being used for training the tensor factorization model;
a distributed inference engine configured for:
decomposing the tensor data into a plurality of sub-tensors based on the prior probability distribution, and
predicting one or more content items interesting to the user based on the at least one bound and the plurality of sub-tensors; and
a content recommendation engine configured for recommending, to the user as a response to the request, at least one of the one or more content items selected based on user tensor data related to the user.

9. The system of claim 8, further comprising:
a tensor factorization model generator configured for generating the tensor factorization model based on a nonlinear function, wherein the nonlinear function is estimated by assigning a Gaussian process as the prior probability distribution over the nonlinear function.

10. The system of claim 9, wherein the tensor factorization model generator comprises:
a latent factor generator configured for generating latent factors based on the multi-mode tensor;
a nonlinear function input constructor configured for constructing an input, for each entry of the multi-mode tensor, by concatenating latent factors corresponding to the entry from all modes of the multi-mode tensor;
a Gaussian process prior assigner configured for determining the nonlinear function by assigning the Gaussian process as the prior probability distribution over the nonlinear function;

a nonlinear function mapper configured for determining a multivariate Gaussian distribution of function values calculated based on the nonlinear function and the multi-mode tensor; and a jointly trained model generator configured for generating the tensor factorization model based on the multivariate Gaussian distribution.

11. The system of claim 10, wherein the tensor factorization model generator further comprises:

a domain knowledge obtainer configured for obtaining domain knowledge about entries of the multi-mode tensor;

a balanced entry selector configured for selecting balanced entries based on the domain knowledge, wherein the balanced entries comprise the balanced combination of zero and non-zero elements; and an observed tensor data sampler configured for sampling observed entries of the multi-mode tensor based on the noise model to generate observed data, wherein the at least some of the zero and non-zero elements comprise the observed entries.

12. The system of claim 8, wherein the at least one bound includes a variational evidence lower bound that has a closed-form expression.

13. The system of claim 12, wherein the model bound generator comprises:

an inducing point generator configured for generating a plurality of inducing points;

a latent target generator configured for obtaining latent tensor entries and latent targets;

a joint multivariate Gaussian distribution determiner configured for augmenting the tensor factorization model with a conditional Gaussian distribution of the latent tensor entries and the latent targets, based on the plurality of inducing points; and an evidence lower bound generator configured for generating the variational evidence lower bound for the tensor factorization model based on the conditional Gaussian distribution.

14. The system of claim 12, wherein the model bound generator comprises:

a tighter lower bound generator configured for generating, based on the variational evidence lower bound, a tighter bound than the variational evidence lower bound for the tensor factorization model, wherein the one or more content items are predicted based on the tighter bound and the plurality of sub-tensors.

15. A non-transitory machine-readable medium having information recorded thereon for recommending content items to a user, wherein the information, when read by a machine, causes the machine to perform operations comprising:

receiving a request for recommending content items to the user;

obtaining tensor data related to a plurality of users and a plurality of content items based on the request;

decomposing the tensor data into a plurality of sub-tensors based on a prior probability distribution;

determining at least one bound for a tensor factorization model that is generated based on the prior probability distribution, wherein a balanced combination of zero and non-zero elements is selected for the tensor factorization model to prevent learning bias, wherein the tensor factorization model is jointly trained based on at least some of the zero and non-zero elements sampled based on a noise model, and wherein at least one of zero elements indicating missing or unobserved tensor entries of a multi-mode tensor is excluded from being used for training the tensor factorization model;

predicting one or more content items interesting to the user based on the at least one bound and the plurality of sub-tensors; and recommending, to the user as a response to the request, at least one of the one or more content items selected based on user tensor data related to the user.

16. The medium of claim 15, wherein the operations further comprise:

generating the tensor factorization model based on a nonlinear function, wherein the nonlinear function is estimated by assigning a Gaussian process as the prior probability distribution over the nonlinear function.

17. The medium of claim 16, wherein generating the tensor factorization model comprises:

generating latent factors based on the multi-mode tensor;

constructing an input, for each entry of the multi-mode tensor, by concatenating latent factors corresponding to the entry from all modes of the multi-mode tensor;

determining the nonlinear function by assigning the Gaussian process as the prior probability distribution over the nonlinear function;

determining a multivariate Gaussian distribution of function values calculated based on the nonlinear function and the multi-mode tensor; and generating the tensor factorization model based on the multivariate Gaussian distribution.

18. The medium of claim 17, wherein generating the tensor factorization model further comprises:

obtaining domain knowledge about entries of the multi-mode tensor;

selecting balanced entries based on the domain knowledge, wherein the balanced entries comprise the balanced combination of zero and non-zero elements, wherein the at least some of the zero and non-zero elements comprise observed entries of the multi-mode tensor sampled based on the noise model to generate observed data.

19. The medium of claim 15, wherein the at least one bound includes a variational evidence lower bound that has a closed-form expression.

20. The medium of claim 19, wherein the operations further comprise:

generating a plurality of inducing points;

obtaining latent tensor entries and latent targets;

augmenting the tensor factorization model with a conditional Gaussian distribution of the latent tensor entries and the latent targets, based on the plurality of inducing points; and generating the variational evidence lower bound for the tensor factorization model based on the conditional Gaussian distribution.

21. The medium of claim 19, wherein the operations further comprise:

generating, based on the variational evidence lower bound, a tighter bound than the variational evidence lower bound for the tensor factorization model, wherein the one or more content items are predicted based on the tighter bound and the plurality of sub-tensors.

* * * * *